United States Patent
Duruoz (10) Patent No.: US 6,804,746 B2
(45) Date of Patent: Oct. 12, 2004

(54) METHOD AND SYSTEM FOR OPTIMIZING DATA STORAGE AND RETRIEVAL BY AN AUDIO/VIDEO FILE SYSTEM USING HIERARCHICAL FILE ALLOCATION TABLE

(75) Inventor: Ibrahim Cem Duruoz, San Francisco, CA (US)

(73) Assignees: Sony Corporation, Tokyo (JP); Sony Electronics Inc., Parkridge, NJ (US)

( * ) Notice: Subject to any disclaimer, the term of this patent is extended or adjusted under 35 U.S.C. 154(b) by 296 days.

(21) Appl. No.: 10/005,204

(22) Filed: Dec. 3, 2001

(65) Prior Publication Data

US 2002/0124133 A1 Sep. 5, 2002

Related U.S. Application Data

(60) Provisional application No. 60/272,846, filed on Mar. 1, 2001.

(51) Int. Cl.[7] .............................................. G06F 12/00
(52) U.S. Cl. ...................... 711/112; 711/170; 711/173; 711/202; 711/205; 711/206; 711/207; 711/208; 711/209; 711/211; 707/205
(58) Field of Search ................................ 711/170, 173, 711/202, 205, 206, 207, 208, 209, 211; 707/205

(56) References Cited

U.S. PATENT DOCUMENTS 5,956,745 A  *  9/1999  Bradford et al. ............ 711/137
5,963,983 A  * 10/1999  Sakakura et al. ........... 711/202
6,532,517 B1 *  3/2003  Wagner et al. .............. 711/112

* cited by examiner

Primary Examiner—Donald Sparks
Assistant Examiner—Bao Q. Truong
(74) Attorney, Agent, or Firm—Charles J. Kulas; Carpenter & Kulas, LLP.

(57) ABSTRACT

A system for optimizing data storage and retrieval by an audio/video system using a number of different tables is disclosed. According to one aspect of the system, the system includes two different types of hierarchical file allocation tables (HFATs), a contiguous space table, a track table and a list table. The two different types of HFATs are a 0th order HFAT and a 1st order HFAT. Each of the two types of HFATs contains a number of entries. Each 0th order HFAT entry corresponds to a specific disk block and each 1st order HFAT entry corresponds to a specific subdivision within a subdivided disk block. A 0th order HFAT entry and an 1st order HFAT entry is linkable to one another to allow disk blocks and subdivisions which make up a file to be identified. The contiguous space table is used to store information relating to the location and availability of contiguous spaces or disk blocks. The track table contains a number of records. Each record, in turn, contains various track, HMSF and descriptor information. The list table similarly contains a number of records each containing information about a list such as size and starting location.

10 Claims, 7 Drawing Sheets

0th order HFAT entry format

| 4 bits | 16 bits | 12 bits |

0000 [ ] [ ] = empty

0001 | x x x | x x x | = 1st order HFAT

1111 | x x x | x x x | = 1st order HFAT subdivision full

1110 | x x x | x x x | = disk block full

Track Table

List Table

METHOD AND SYSTEM FOR OPTIMIZING DATA STORAGE AND RETRIEVAL BY AN AUDIO/VIDEO FILE SYSTEM USING HIERARCHICAL FILE ALLOCATION TABLE

CROSS-REFERENCES TO RELATED APPLICATIONS

The present application claims the benefit of priority under 35 U.S.C. § 119 from U.S. Provisional Patent Application Serial No. 60/272,846, entitled "METHOD AND SYSTEM FOR OPTIMIZING DATA STORAGE AND RETRIEVAL BY AN AUDIO/VIDEO FILE SYSTEM USING HIERARCHICAL FILE ALLOCATION AND OTHER TABLES" by Duruoz, filed Mar. 1, 2001, the disclosure of which is hereby incorporated by reference in its entirety for all purposes.

The present application is related to the following co-pending, commonly assigned applications including: U.S. Provisional Patent Application Serial No. 60/272,798, entitled "APPLICATION PROGRAMMING INTERFACE FOR COMMUNICATION BETWEEN AUDIO/VIDEO FILE SYSTEM AND HARD DISK DRIVE SOFTWARE" by Duruoz et al., filed on Mar. 1, 2001; U.S. patent application Ser. No. 10/005,206 entitled "PROCESS CONTROL MANAGER FOR AUDIO/VIDEO FILE SYSTEM" by Duruoz, filed concurrently herewith, which claims the benefit of priority from U.S. Provisional Patent Application Serial No. 60/272,804, entitled "PROCESS CONTROL MANAGER FOR AUDIO/VIDEO FILE SYSTEM" by Duruoz, filed on Mar. 1, 2001; and U.S. patent application Ser. No. 10/005,884 entitled "APPLICATION PROGRAMMING INTERFACE FOR COMMUNICATION BETWEEN AUDIO/VIDEO FILE SYSTEM AND AUDIO/VIDEO CONTROLLER" by Duruoz et al., filed concurrently herewith, which claims the benefit of priority from U.S. Provisional Patent Application Serial No. 60/272,863, entitled "APPLICATION PROGRAMMING INTERFACE FOR COMMUNICATION BETWEEN AUDIO/VIDEO FILE SYSTEM AND AUDIO/VIDEO CONTROLLER" by Duruoz et al., filed on Mar. 1, 2001, all of which are incorporated in their entirety by reference herein.

BACKGROUND OF THE INVENTION

With the proliferation of digital audio and video devices, it has become necessary to establish a high speed serial communication mechanism that is capable of allowing efficient and fast transfer of audio/video (A/V) data between devices. IEEE 1394 has so far been a successful candidate for this purpose.

While the transmission of A/V data using industry standard such as IEEE 1394 is well known, the storage of A/V data on modern computing devices is becoming an important issue. Modem computing devices are rapidly moving toward offering various kinds of functionality and features in an integrated manner. For example, a personal computer (PC) nowadays generally contains a myriad of computer programs which offer a variety of functionality, such as word processing programs as well as computer programs which are capable of processing and playing video and audio data. As a result, there is a need to store both A/V data and non-A/V data and both types of data are typically stored on a computer hard disk together.

To store data on the hard disk or other media, a file system is generally required to be in place to organize files and accomplish a number of file-handling tasks such as file creation, deletion, access, save and update. Furthermore, it is preferable and common practice for a file system to have a directory structure which organizes and provides information about all the files stored in the file system. Typically, a file system is capable of storing both A/V and non-A/V data.

A/V data and non-A/V data, however, are fundamentally different in a number of respects. For example, the size of A/V data files is relatively large when compared to the size of non-A/V data files.

In addition, A/V data are typically stored in both large and small files. For example, the A/V data for a movie (in the range of gigabytes) is usually stored in one file and summary information about the movie, such as size of file, length of movie and other relevant information, is stored separately in a descriptor file (in the range of kilobytes) which typically is significantly smaller than the file containing the movie. As a result, handling files of varying sizes in an efficient manner becomes a challenging issue.

Moreover, since A/V data files are generally very large, it is usually not possible to store an entire A/V data file in a temporary storage area such as the random access memory (RAM). Therefore, due to the large size of an A/V data file, efficient random access of A/V data within the A/V data file also presents a problem.

Furthermore, the retrieval and processing of A/V data are subject to relatively stringent time and order-related constraints. Such constraints are necessary to prevent the corruption of A/V data and avoid potential glitches. For example, in order to provide a smooth presentation of video images, A/V data need to be retrieved and processed quickly and continuously in the correct sequential order. Otherwise, the video images might become choppy and incomplete. Hence, it would be desirable to develop and provide a method and system capable of allowing an A/V file system to handle a mix of A/V and non-A/V data in an efficient manner.

Figure 1:
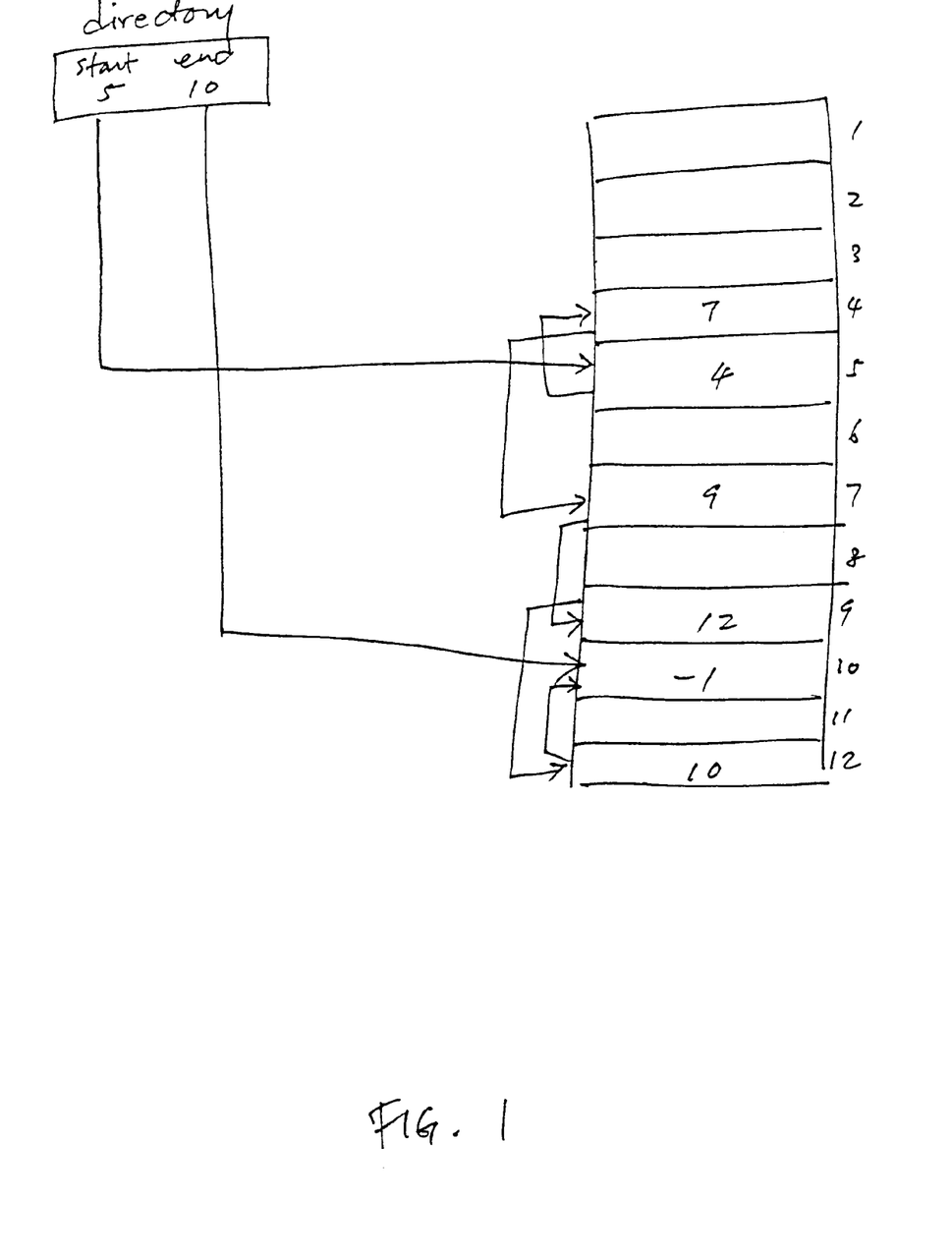
FIG. 1 is a simplified schematic diagram illustrating the linked allocation method.

In almost every case, many files are stored on the same physical storage media such as a disk. The main problem is how to allocate space to these files so that disk space is utilized efficiently and files can be accessed quickly. A number of allocation methods are well known. For example, in the linked allocation method as shown in FIG. 1, each file is a linked list of disk blocks which may be scattered anywhere on the disk. The directory contains a pointer to the first and last blocks of the file and each disk block contains a pointer to the next disk block.

Figure 2:
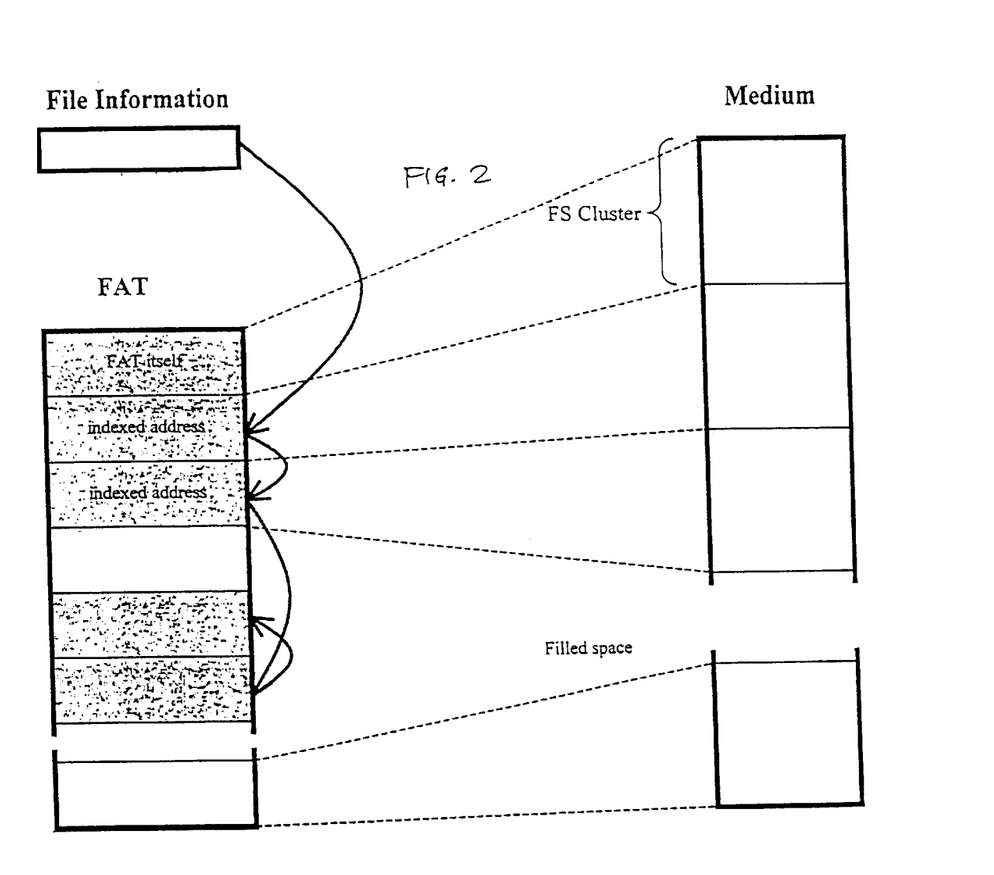
FIG. 2 is a simplified schematic diagram illustrating an example of the file allocation table.

A variation of the linked allocation method is the use of a file-allocation table (FAT) as shown in FIG. 2. A section of disk at the beginning of each partition is set aside to contain the FAT. The FAT has one entry for each disk block (or cluster) and is indexed by block number. In other words, each FAT entry corresponds to a unique region on the disk. For a given disk size, the FAT size is fixed. The directory entry contains the block number of the first block of the file. The FAT entry indexed by that block number then contains the block number of the next block in the file. This linked list continues until the last block which has a special end-of-file value as the FAT entry. Unused blocks are typically indicated by a "0" FAT entry value.

This linked allocation method using a FAT has a number of disadvantages. For example, the disk head must move to the start of the partition to read the FAT and find the location of the block in question, then move to the location of the block itself. Therefore, it would be desirable to develop and provide a method and system capable of reducing disk head movement so as to improve data access time.

Furthermore, in a system which contains very large and small files, disk space is wasted since one FAT entry is used even if the file is much smaller than the block or cluster size. In other words, since each FAT entry is mapped to a unique disk block, the space in such disk block is not efficiently utilized if the size of a file is substantially smaller than the size of a disk block. On the other hand, if a disk block is chosen to be small, then the number of FAT entries will proportionally increase, which means there is less room on the disk for data storage. Hence, it would be desirable to develop and provide a method and system capable of allowing an A/V file system to utilize disk space more efficiently.

SUMMARY OF THE INVENTION

The present invention relates to an audio/video file system. More specifically, the present invention is directed to a method and system for optimizing data storage and retrieval by an audio/video system using hierarchical file allocation and other tables.

In an exemplary embodiment, an A/V file system implemented in accordance with the present invention includes two different types of hierarchical file allocation tables (HFATs), a contiguous space table, a track table and a list table.

The two different types of HFATs are a 0th order HFAT and a 1st order HFAT. Each of the two types of HFATs contains a number of entries. Each 0th order HFAT entry corresponds to a specific disk block and each 1st order HFAT entry corresponds to a specific subdivision within a subdivided disk block.

A 0th order HFAT entry is made up of three fields, namely, a type indicator, a 0th order index, and a 1st order index. The type indicator is used indicate whether a 1st order HFAT is referenced by a 0th order HFAT entry. If a 1st order HFAT is referenced by the 0th order HFAT, then the 0th order index is used to locate the disk block which contains the referenced 1st order HFAT. Once the disk block is located, the 1st order index is used to locate a specific 1st order HFAT entry within the 1st order HFAT. The specific 1st order HFAT entry is mapped to a subdivision which contains the next segment of the file.

The contiguous space table is used to store information relating to the location and availability of contiguous spaces or disk blocks. Each record in the contiguous space table includes a HFAT index and an associated quantity indicator. The HFAT index points to the HFAT entry which is mapped to the first of one or more contiguous empty disk blocks. The associated quantity indicator shows the number of contiguous empty disk blocks starting from the disk block which corresponds to the particular HFAT entry referenced by the HFAT index.

The track table contains a number of records. Each record, in turn, contains various track, HMSF and descriptor information.

The list table similarly contains a number of records each containing information about a list such as size and starting location.

Reference to the remaining portions of the specification, including the drawings and claims, will realize other features and advantages of the present invention.

Further features and advantages of the present invention, as well as the structure and operation of various embodiments of the present invention, are described in detail below with respect to accompanying drawings. In the drawings, like reference numbers indicate identical or functionally similar elements.

DETAILED DESCRIPTION OF THE INVENTION

Embodiments of the present invention will now be described. In a preferred embodiment, an A/V file system implemented in accordance with the present invention contains various types of tables, including hierarchical file allocation tables, contiguous space tables, track tables and list tables. Each type of table will be described in further details below. It is to be understood that the number of tables to be implemented for each table type depends on the design and implementation of the A/V file system.

Figure 3:
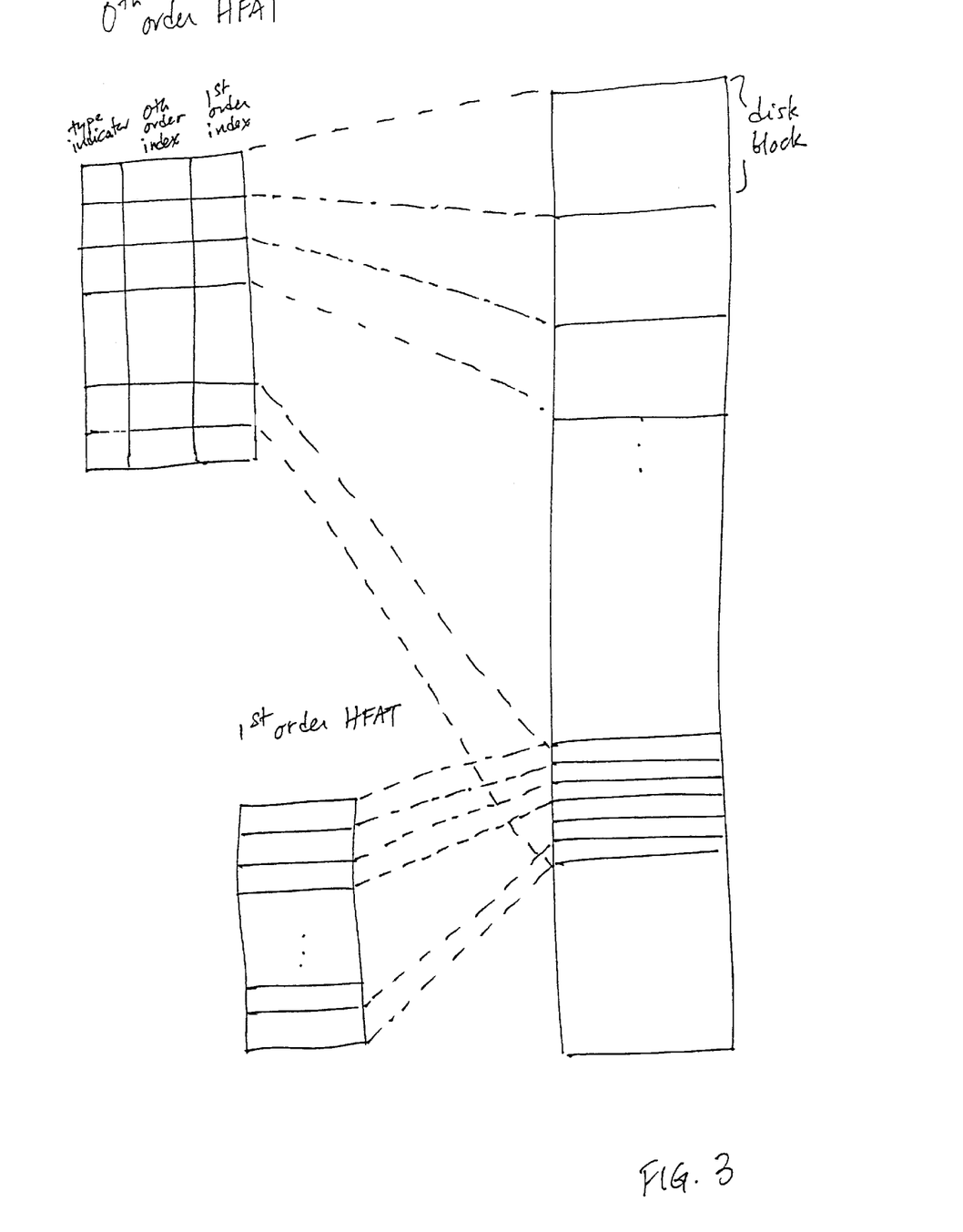
FIG. 3 is a simplified schematic diagram showing a hierarchical file allocation table in accordance with one embodiment of the present invention.

In an exemplary embodiment, as illustrated in FIG. 3, there are two different types of hierarchical file allocation tables (HFATs), namely, a 0th order HFAT and a 1st order HFAT. A section of the disk at the beginning of each partition is reserved to contain the 0th order HFAT. The 0th order HFAT has a number of table entries. Each 0th order HFAT entry is uniquely mapped to a disk block. The mapping relationships between the disk blocks and the 0th order HFAT entries are separately stored and maintained in one or more data tables. The first table entry in the 0th order HFAT is mapped to the disk block which contains the 0th order HFAT itself. Each subsequent table entry in the 0th order HFAT contains information about another HFAT entry.

Furthermore, a disk block which is mapped to a 0th order HFAT entry may be further divided into subdivisions. The subdivision at the beginning of such subdivided disk block is reserved to contain the 1st order HFAT. Similarly, the 1st order HFAT contains a number of table entries. Each 1st order HFAT entry is uniquely mapped to a subdivision within the subdivided disk block. The mapping relationships between the subdivisions and the 1st order HFAT entries are separately stored and maintained in one or more data tables. The first table entry in the 1st order HFAT is mapped to the subdivision which contains the 1st order HFAT itself. Each subsequent table entry in the 1st order HFAT contains information about another HFAT entry.

By subdividing a disk block into subdivisions, segments of a file can then be stored in a combination of disk blocks and subdivisions. Hence, a HFAT entry may contain information which corresponds to either a disk block or a subdivision.

As mentioned above, a 0th order HFAT entry and a 1st order HFAT entry both contain information about another HFAT entry. More specifically, a HFAT entry, whether a 0th order or an 1st order, contains information about another HFAT entry which corresponds to the next disk block or subdivision in the file. This information is typically provided in the form of a pointer. In other words, a HFAT entry points or links to another HFAT entry which maps to the next disk block or subdivision in the file. The details of how the HFAT entries link to one another will be described further below.

Figure 4:
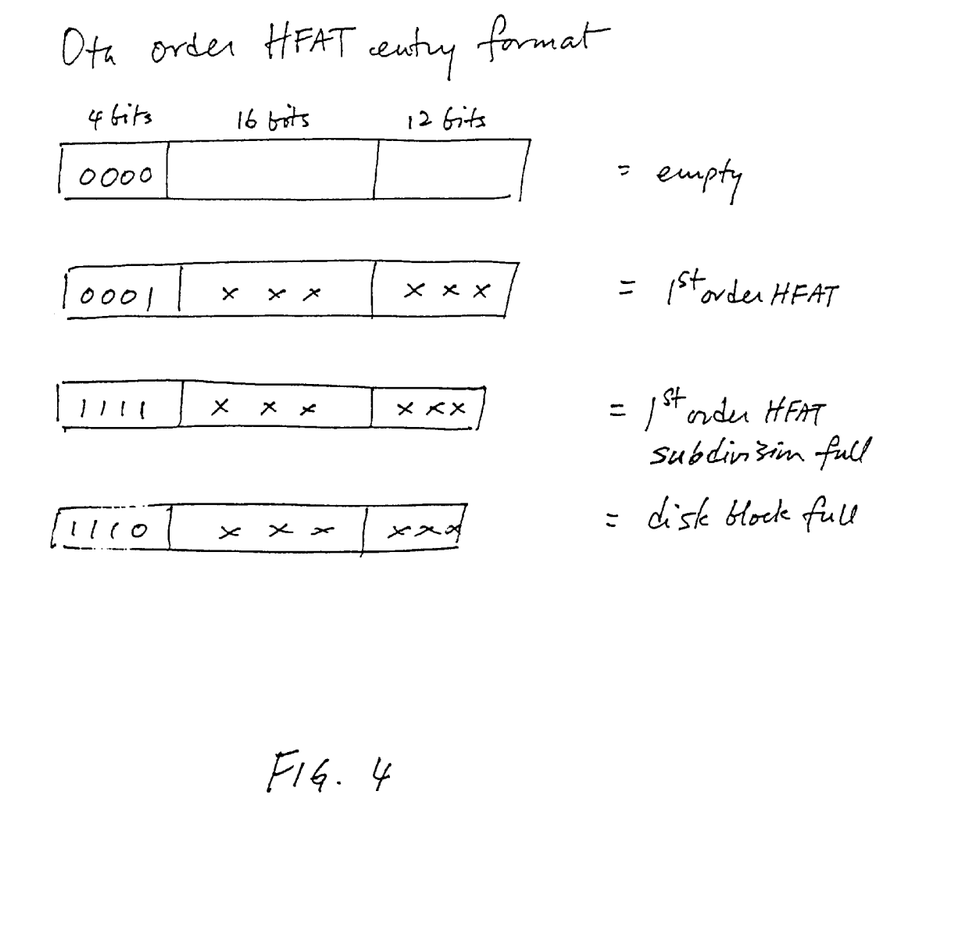
FIG. 4 is a simplified schematic diagram showing the format of a hierarchical file allocation table entry in accordance with one embodiment of the present invention.

A 0th order HFAT entry is made up of three different fields, namely, a type indicator, a 0th order index or coarse index, and a 1st order index or fine index. In one embodiment, the 0th order HFAT entry is a 32-bit word having a 4-bit type indicator, a 16-bit 0th order index, and a 12-bit 1st order index.

The type indicator is made up of a number of bits, preferably, located at the beginning of each 0th order HFAT entry. The type indicator is used to indicate whether a 1st order HFAT is referenced by a particular 0th order HFAT entry. In other words, the type indicator is used to indicate whether a particular disk block contains subdivisions. As shown in FIG. 4, four bits are used to implement the type indicator for this purpose. The combinations that can be generated by 4 bits are used to represent different status. For example, "0000" indicates that a particular 0th order HFAT entry does not reference any 1st order HFAT and that the disk block mapped to this particular 0th order entry is empty; "0001" indicates that a 1st order HFAT is referenced by a particular 0th order HFAT entry and that the subdivisions mapped to the 1st order HFAT have empty spaces; "1111" indicates that a 1st order HFAT is referenced by a particular 0th order HFAT entry and that the subdivisions mapped to the 1st order HFAT are full; and "1110" indicates that a particular 0th order entry does not reference any 1st order HFAT and that the disk block mapped to this particular 0th order entry is full. It is to be understood that the foregoing is provided as an example for illustrative purposes only and that a person of ordinary skill in the art will know of other ways to use bit combinations to represent status information for an entry in accordance with the present invention.

Depending on the status indicated by the type indicator, the 0th order index and the 1st order index are used accordingly to link up to the next disk block or subdivision. If the type indicator indicates that a particular 0th order HFAT entry does not reference a 1st order HFAT, i.e., the next segment of the file is stored in a disk block (as opposed to a subdivision), the 0th order index then provides a pointer pointing to another 0th order HFAT entry which is mapped to the disk block containing the next segment of the file.

On the other hand, if the type indicator indicates that a 1st order HFAT is referenced by a particular 0th order HFAT entry, i.e., the next segment of the file is stored in a subdivision, the 0th order index then provides a pointer to the corresponding disk block which contains the subdivision.

Having located the corresponding disk block which contains the subdivision, the 1st order HFAT for the subdivisions of that disk block can be retrieved. Once the 1st order HFAT is retrieved, the 1st order index then provides a pointer to the pertinent 1st order HFAT entry which is mapped to the desired subdivision.

Alternatively, the 0th order index and the 1st order index can be viewed in terms of granularity. The 0th order index provides a coarse index which corresponds to a disk block, while the 1st order index provides a fine index which corresponds to a subdivision within a disk block.

Similarly, a 1st order HFAT entry contains information about the next segment of a file. Typically, the 1st order HFAT entry contains a pointer which points to a HFAT entry, whether a 0th order or an 1st order, which is mapped to the next disk block or subdivision of the file.

As discussed above, using the 0th order index and the 1st order index, the table entries of the 0th order HFAT and the 1st order HFAT can be linked together as a list. This linked list continues until the last disk block or subdivision which has a special end-of-file value as the corresponding HFAT entry.

By having two types of HFATs, namely, the 0th order HFAT and the 1st order HFAT, a relatively small file can now be stored within a subdivision of a disk block. Each subdivision is capable of being individually referenced and addressed using an 1st order HFAT entry which, in turn, is referenced by an 1st order index within a 0th order HFAT entry. By making individual subdivisions available within a disk block, a small file can be stored in a subdivision thus leaving other subdivisions available for other files. Conversely, a disk block can be reserved for use by a larger file. Hence, the use of disk blocks and subdivisions makes more efficient use of the storage media. In one example, an A/V file can be stored amongst various disk blocks while the descriptor file for the A/V file can be stored within an addressable subdivision of a single disk block. In another example, a number of disk blocks can be used to store the majority of a large A/V file while subdivisions can be used to store the remaining portion.

It is to be understood that, depending on the particular application, 2nd order HFAT entries can be introduced to render the space within a subdivision addressable. Similar to dividing a disk block into subdivisions, a subdivision is further divided into addressable subunits. A 2nd order HFAT is then stored in the first subunit within a subdivision and each entry in the 2nd order HFAT corresponds to a unique subunit. If a 2nd order HFAT is used, a 2nd order index is to be included in the 0th order HFAT entry. The 2nd order index is used to allow a particular entry in the 2nd order HFAT to be located.

Similarly, the storage media can be further divided depending on the design and application, and corresponding additional levels of HFATs can be implemented. Based on the disclosure provided above, a person of ordinary skill in the art will be able to implement the foregoing concept in accordance with the present invention.

In an exemplary embodiment, an A/V file system implemented in accordance with the present invention also includes a contiguous space table (CST). The function of the CST is to help locate the largest contiguous space within the storage medium. Locating contiguous space is important because data access from contiguous disk blocks is faster than access from disjointed disk blocks.

Figure 5:
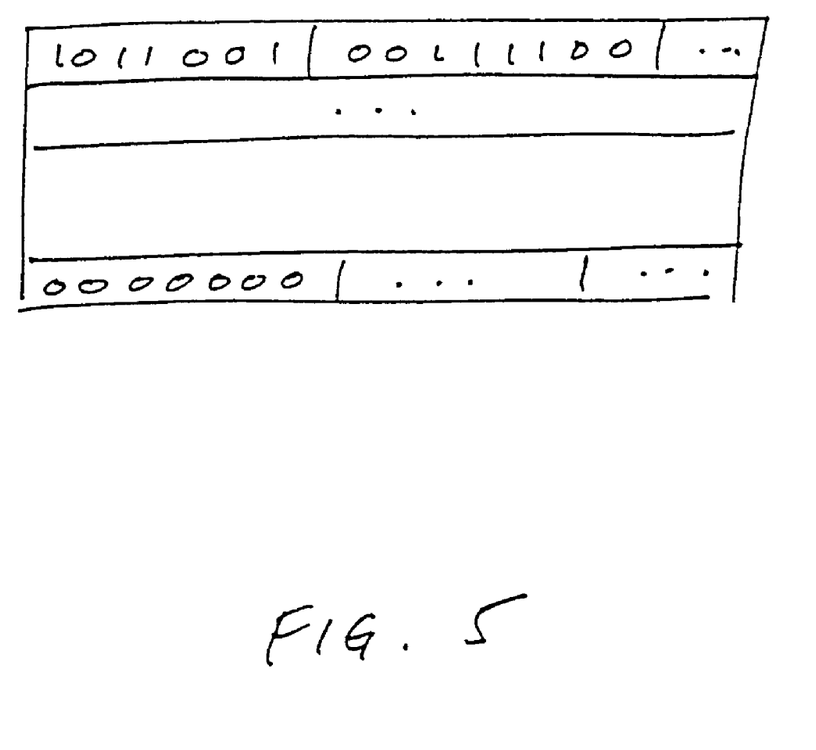
FIG. 5 is a simplified schematic diagram showing a contiguous space table in accordance with one embodiment of the present invention.

In a preferred embodiment, as shown in FIG. 5, the CST is implemented using a bit table. Each bit of the bit table is singly mapped to a corresponding disk block. In other words, there is a unique one-to-one relationship between a bit and a disk block. The mapping relationships between the bits and the disk blocks are separately stored in a data table. The state of a bit is used to indicate the availability of a disk block. For example, a "0" can be used to indicate that the corresponding disk block is empty and an "1" can be used to indicate that the corresponding disk block is full. Hence, by locating the longest consecutive bit string with the same state, for example, a bit string of "0", the largest contiguous disk blocks can be identified.

Figure 6:
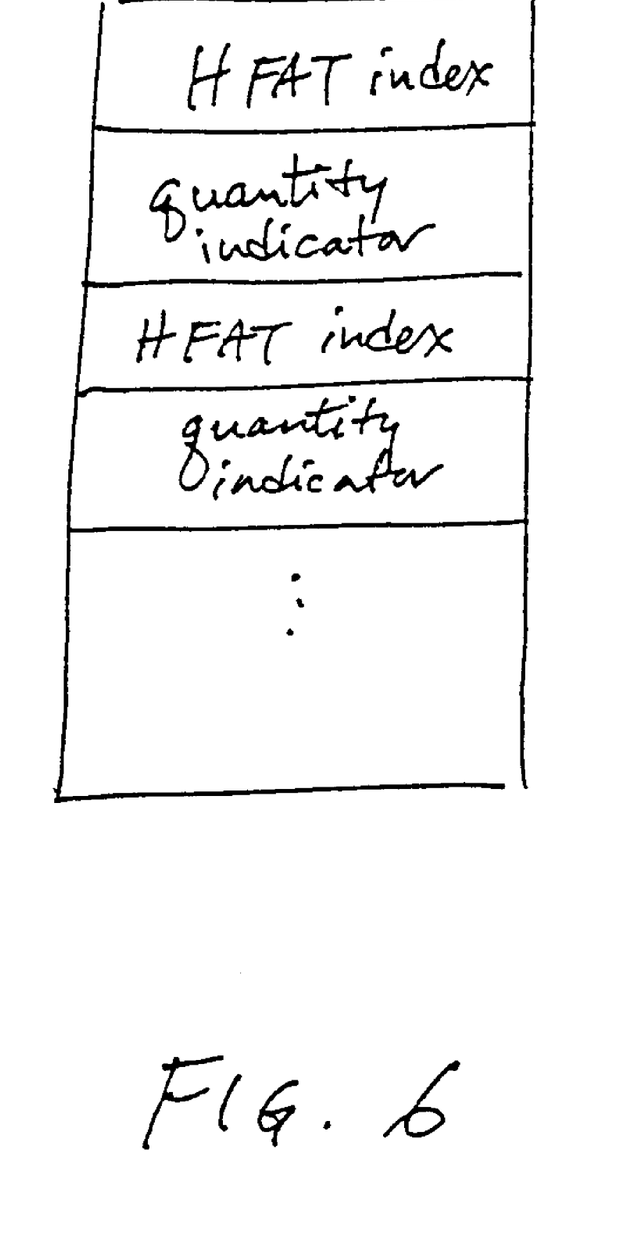
FIG. 6 is a simplified schematic diagram showing a contiguous space table in accordance with another embodiment of the present invention.

In an alternative embodiment, as shown in FIG. 6, the CST is implemented in the form of a table having HFAT indices and quantity indicators showing the amount of available empty spaces. More specifically, each HFAT index is used to indicate where one or more empty disk blocks begin on the storage medium, i.e., a HFAT index provides a pointer to locate the HFAT entry which corresponds to an empty disk block. Each HFAT index is associated with a quantity indicator which is used to indicate the number of contiguous empty disk blocks starting from the HFAT entry referenced by that HFAT index. For example, if a quantity indicator associated with a HFAT index has a value of "5", it means that five contiguous empty disk blocks are available beginning from the disk block which corresponds to the HFAT entry referenced via the HFAT index.

In an exemplary embodiment, an A/V file system implemented in accordance with the present invention also includes a track table and a list table. These two tables are instances of hash tables and are used to locate information about a given A/V track or object. These tables are also used to locate descriptor files.

Figure 7:
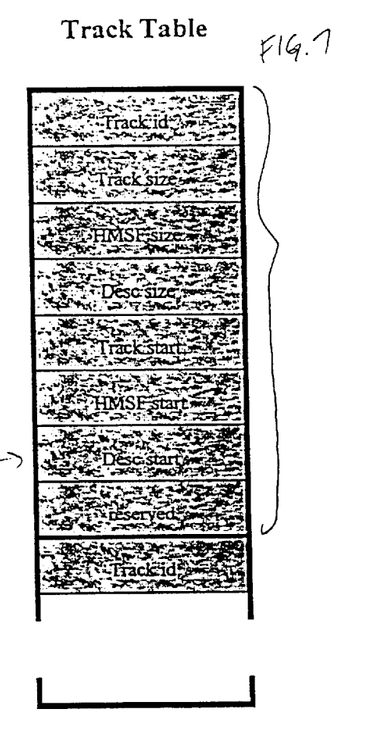
FIG. 7 is a simplified schematic diagram showing a track table in accordance with one embodiment of the present invention.

Referring to FIG. 7, the track table includes a number of records each of which contains the following fields including, track ID, track size, HMSF size, descriptor size, track start, HMSF start, and descriptor start. Each of these fields represents various types of information as follows. Track ID stores the identification information about a track.

Track size, HMSF size and descriptor size store the size information about a track, a HMSF table and a descriptor, respectively. A HMSF table is a table which contains timing and location information about a track. This table is particularly useful for tracks containing A/V data. For example, if a track contains A/V data for a movie, the HMSF table may then contain information on the specific track location where an hour has elapsed in the movie.

Finally, track start, HMSF start and descriptor start represent the starting location information about a track, a HMSF table and a descriptor, respectively. These are provided so as to allow a track, a HMSF table and a descriptor to be retrieved easily. Track start, HMSF start and descriptor start are typically implemented in the form of a pointer.

Figure 8:
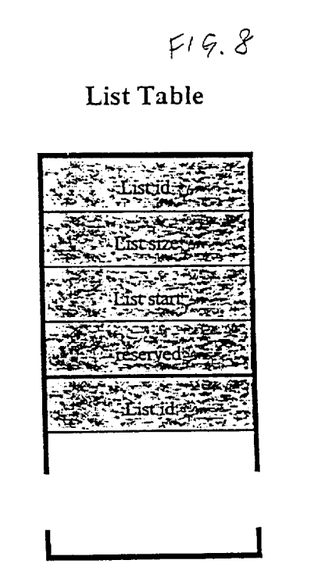
FIG. 8 is a simplified schematic diagram showing a list table in accordance with one embodiment of the present invention.

Referring to FIG. 8, the list table similarly includes a number of records each of which contains the following fields including, list ID, list size, and list start. The list table is desirable because an A/V file system typically contains various lists each linking up two or more tracks for some related purpose. For example, assuming that tracks are used to store A/V data representing various movies, a list may then contain a number of tracks which correspond to a group of movies falling under a particular category such as action movies. The various fields within the list table are self-explanatory—list ID stores the identification information of a list, list size stores the size information of a list, and list start stores the starting location information of a list.

In one embodiment, the track table and the list table are implemented using hash tables. For example, each record in the track table is assigned a bucket within the hash table. With this design, each record can be retrieved quickly since there is no need to search within a bucket. However, it should be understood that more than one record can be assigned to a bucket depending on the system design constraints and requirements. With multiple records in a bucket, there is then a need to perform a search to locate the desired record.

Use of the track table and the list table in cooperation with other devices to be described below reduces the number of disk access during operation of an A/V file system. For example, during a record operation, the A/V file system typically loads and updates the descriptor file for the desired track first and then records the A/V data onto the desired track. It will be demonstrated below that by using the track table, the number of disk access can be reduced by one for the above record operation.

Without the track table, one disk access need to be made to retrieve information on the descriptor file, and a second disk access need to be made to update the descriptor file. Since the track information is not available, a third disk access is required to retrieve information on the desired track to allow the record operation to be completed and a fourth disk access is needed to record the A/V data onto the desired track.

In contrast, using the track table, the A/V file system performs one disk access to read the relevant record for the desired track from the track table. The A/V file system then stores the relevant record into a cache. Since each record of the track table contains information about a particular track and its corresponding descriptor file, the track and the descriptor information is readily available from the cache. The A/V file system then performs a second disk access to update the descriptor file. With the cached record from the track table, the necessary track information is readily available and thus the A/V file system is able to perform a third disk access to record the A/V data onto the desired track without having to first perform a disk access to retrieve the needed track information.

In an exemplary embodiment, the present invention is implemented via software using computer programming languages such as C and C++. However, it should be understood that a person with ordinary skill in the art will know of additional computer programming languages as well as other ways, techniques, and methods to implement the present invention.

It should be further understood that while a preferred embodiment of the present invention is implemented using hard disks, a person with ordinary skill in the art will know of other media which can be used to implement the present invention.

It is understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A system for allocating space for a file within a storage medium, comprising:

a first hierarchical file allocation table having a first plurality of entries; and a second hierarchical file allocation table having a second plurality of entries;

wherein said storage medium is configured to include a plurality of blocks, each block having a plurality of subdivisions;

wherein each of said first plurality of entries is configured to map to one of said plurality of blocks;

wherein each of said second plurality of entries is configured to map to one of said plurality of subdivisions;

wherein one of said first plurality of entries is capable of being linked to one of said second plurality of entries;

wherein an entry of said first hierarchical file allocation table includes a type indicator, a coarse index and a fine index;

wherein said coarse index is used to locate a block containing said second hierarchical file allocation table; and wherein said fine index is used to locate an entry in said second hierarchical file allocation table.

2. A system for allocating and optimizing space for a file within a storage medium, said storage medium being partitioned into a plurality of blocks and each block being further partitioned into a plurality of subdivisions, and said file being stored in a plurality of segments comprising blocks and subdivisions, comprising:

a first file allocation table having a first plurality of entries; and a second file allocation table having a second plurality of entries;

wherein each of said first plurality of entries is configured to map to one of said plurality of blocks;

wherein each of said second plurality of entries is configured to map to one of said plurality of subdivisions; and wherein an entry in said first file allocation table is capable of being linked to another entry in said first file allocation table or an entry in said second file allocation table;

wherein an entry in said first file allocation table includes a type indicator, a 0th order index, and an 1st order index;

wherein said 0th order index is used to locate a block containing said second file allocation table; and wherein said 1st order index is used to locate said entry in said second file allocation table.

3. The system according to claim 2, wherein said entry in said second file allocation table is mapped to a subdivision which represents one of said plurality of segments in said file.

4. A storage medium for storing and organizing a plurality of files, comprising:

a plurality of partitions, wherein one or more of said partitions each further having a plurality of subdivisions;

a first file allocation table having a first plurality of entries, wherein said first file allocation table is stored within a partition;

a second file allocation table having a second plurality of entries for each partition having a plurality of subdivisions, wherein said second file allocation table is stored within a subdivision;

wherein each of said first plurality of entries is configured to map to one of said plurality of partitions;

wherein for each partition having a plurality of subdivisions, each of said second plurality of entries in said second file allocation table is configured to map to one of said plurality of subdivisions;

wherein an entry in said first file allocation table is capable of being linked to either another entry in said first file allocation table or an entry in said second file allocation table;

wherein said entry in said first file allocation table includes a type indicator, a coarse index and a fine index;

wherein said coarse index is used to locate a partition containing said second file allocation table; and wherein said fine index is used to locate said entry in said second file allocation table.

5. An audio/video file system for allocating space for a file and optimizing access thereto, comprising:

a first file allocation table having a first plurality of entries;

a second file allocation table having a second plurality of entries; and a storage medium having a plurality of blocks;

wherein one or more of said plurality of blocks each further includes a plurality of subdivisions;

wherein each of said plurality of entries is configured to map to one of said plurality of blocks;

wherein each of said second plurality of entries is configured to map to one of said plurality of subdivisions; and wherein an entry in said first file allocation table is capable of being linked to either another entry in said first file allocation table or an entry in said second file allocation table;

a contiguous space table having a plurality of records, each record including an index and a quantity indicator.

6. The audio/video file system according to claim 5, wherein said index points to an entry in said first file allocation table corresponding to the beginning location of a number of contiguous empty blocks; and wherein said quantity indicator represents said number of contiguous empty blocks.

7. The audio/video file system according to claim 5 further comprising:

a contiguous space table implemented using a bit string;

wherein each bit in said bit string is configured to map to one of said plurality of blocks and each bit is used to indicate the status of its corresponding block.

8. The audio/video file system according to claim 5 further comprising:

a track table having a plurality of records, each record including information relating to track ID, track size, time/location table size, descriptor file size, and respective starting locations of a track, a time/location table, and a descriptor file.

9. The audio/video file system according to claim 5 further comprising:

a list table having a plurality of records, each record including information relating to list ID, list size and starting location of a list.

10. A method for allocating space for a file within a storage medium having a plurality of partitions, comprising steps of:

dividing a partition into a plurality of subdivisions;

creating a first file allocation table having a first plurality of entries;

creating a second file allocation table having a second plurality of entries;

mapping said first plurality of entries to said plurality of partitions;

mapping said second plurality of entries to said plurality of subdivisions;

linking an entry in said first file allocation table to either another entry in said first file allocation table or an entry in said second file allocation table;

wherein said entry in said first file allocation table includes a type indicator, a coarse index and a fine index;

wherein said coarse index is used to locate said partition containing said plurality of subdivisions which contains said second file allocation table; and wherein said fine index is used to locate said entry in said second file allocation table.

* * * * *